United States Patent [19]
Chou et al.

[11] Patent Number: 5,737,489
[45] Date of Patent: Apr. 7, 1998

[54] DISCRIMINATIVE UTTERANCE VERIFICATION FOR CONNECTED DIGITS RECOGNITION

[75] Inventors: Wu Chou, Berkeley Heights; Biing-Hwang Juang, Warren; Chin-Hui Lee, New Providence; Mazin G. Rahim, Manalapan, all of N.J.

[73] Assignee: Lucent Technologies Inc., Murray Hill, N.J.

[21] Appl. No.: 528,902

[22] Filed: Sep. 15, 1995

[51] Int. Cl.⁶ .................................................. G10L 5/06
[52] U.S. Cl. ...................... 395/2.65; 395/2.41; 395/2.45; 395/2.47; 395/2.48; 395/2.49; 395/2.6
[58] Field of Search ................................ 395/2.4, 2.41, 395/2.45, 2.47, 2.48, 2.49, 2.51, 2.6, 2.65

[56] References Cited

U.S. PATENT DOCUMENTS

| | | | |
|---|---|---|---|
| 4,348,553 | 9/1982 | Baker et al. | 179/1 SB |
| 5,125,022 | 6/1992 | Hunt et al. | 379/88 |
| 5,127,043 | 6/1992 | Hunt et al. | 379/88 |
| 5,297,194 | 3/1994 | Hunt et al. | 379/88 |
| 5,303,299 | 4/1994 | Hunt et al. | 379/88 |
| 5,349,645 | 9/1994 | Zhao | 395/2.52 |
| 5,579,436 | 11/1996 | Chou et al. | 395/2.53 |

*Primary Examiner*—Allen R. MacDonald
*Assistant Examiner*—Alphonso A. Collins

[57] ABSTRACT

In a speech recognition system, a recognition processor receives an unknown utterance signal as input. The recognition processor in response to the unknown utterance signal input accesses a recognition database and scores the utterance signal against recognition models in the recognition database to classify the unknown utterance and to generate a hypothesis speech signal. A verification processor receives the hypothesis speech signal as input to be verified. The verification processor accesses a verification database to test the hypothesis speech signal against verification models reflecting a preselected type of training stored in the verification database. Based on the verification test, the verification processor generates a confidence measure signal. The confidence measure signal can be compared against a verification threshold to determine the accuracy of the recognition decision made by the recognition processor.

19 Claims, 5 Drawing Sheets

FIG. 5

DISCRIMINATIVE UTTERANCE VERIFICATION FOR CONNECTED DIGITS RECOGNITION

FIELD OF THE INVENTION

The present invention relates to the field of speech recognition and verification generally, and more particularly to the field of speech verification training.

BACKGROUND OF THE INVENTION

Speech recognition is a process in which an unknown spoken utterance is identified. Through a process known as training, known words or word strings are examined and features of the words or word strings are sampled and recorded as recognition models in a speech recognizer memory. The recognition models represent typical acoustic renditions of known utterances. In the training process, a training algorithm is applied to the recognition models to form these stored representations which will be utilized to recognize future unknown words and strings of words.

In operation, a speech recognizer receives an unknown utterance and extracts features from an unknown utterance in order to recognize the unknown utterance. The extracted features of the unknown utterance are referred to as a test pattern.

The recognizer then compares combinations of one or more recognition models in memory to the test pattern for the unknown utterance. A scoring technique is used to provide a relative measure of how well each combination of recognition models matches the test pattern. The unknown utterance is recognized as the words associated with the combination of one or more recognition processor models that most clearly matches the unknown utterance.

Previous speech recognition practice has utilized a number "N" of valid possibilities or classes for speech recognition modeling and model training. In such an N-class model, all utterance input to be recognized is assumed to be valid. A recognition model for each of the "N" possible classes of existence is stored in a recognizer memory. All speech input to be recognized, whether valid or not, is classified as one of the N classes. The recognizer calculates a score for the utterance for each of the N models, and matches the utterance to the one class (of the N classes) having the best score.

The concept of an additional or "N+1" class, in addition to the N valid classes of recognition, has been developed to provide an associated N+1 model (denoted a "filler" model). In such a system, the input utterance to be recognized is scored against each of the N models for the N valid classes of input and, additionally, against the N+1 filler class model. The N+1 model is designed to represent all invalid input. Use of an N+1 filler model further refined the recognition process to consider that an input utterance or a segment of an input utterance might not be valid.

Once an unknown utterance is classified by a speech recognition process, it is often desirable to evaluate the authenticity of the classification decision made by the speech recognizer. This can be accomplished through a two-pass process, wherein an unknown utterance is first recognized (classified) by scoring it against N models representing N possible valid classes. The recognition model providing the best score is matched to its associated class, which is recognized as a hypothesis utterance to be subsequently verified. The hypothetical recognized utterance is then verified in a second pass against a filler verification model, which can be similar to the N+1 recognition filler model discussed previously.

A two-pass speech recognition process enables recognition of an unknown utterance followed by a calculated determination of how confident the system is about the recognition decision. For example, the recognizer classifies an unknown utterance as a particular word and the verifier calculates a statistical likelihood, using a filler model, of that classification being correct. The verifier is used to make a binary decision, either "yes" or "no", whether the recognizer classified properly.

Utterance verification represents an important aspect of speech recognition system development. Utterance verification involves rejecting part or all of an entire utterance based on a computed confidence score. This confidence score can be based on a likelihood ratio distance which tests whether or not a word exists in a given segment of speech. The likelihood ratio distance is particularly useful in situations where utterances are spoken without valid words, with poorly recognized utterances, or when significant confusion exists among words which may generate a high error rate.

Successful performance of utterance verification in the context of a speech recognition system is closely associated with the effectiveness of the techniques used to train verification models, which are used in the verification process. There exists a deficiency in conventional training methods, which is due to the lack of a direct relation between training and verification error rate. It has been a problem of standing interest to find a training method that directly minimizes the verification error rate.

SUMMARY OF THE INVENTION

An advance in speech recognition technology is provided by the present invention in which a speech recognition system adopts a two-pass recognition and verification strategy for recognizing an unknown string of connected words. According to an illustrative embodiment of the present invention, the speech recognition system comprises a recognition processor for generating a hypothesis string of connected words based on an acoustic input string of unknown connected words; and, a verification processor which generates a string-based confidence measure signal responsive to the hypothesis string of connected words. A recognition database stores recognition models for use by the recognition processor. A verification database stores verification models for use by the verification processor.

Recognition in the first pass is performed with a conventional Viterbi beam search algorithm using a set of hidden Markov models, which are trained to minimize string classification error. Utterance verification in the second pass is performed to verify the recognized hypothesis string using a set of hidden Markov models trained with a minimum string verification error (MSVE) training process, in accordance with the present invention.

A method of training the verification models stored in the verification database to minimize verification error is utilized. The training method involves calculating and minimizing an expected string verification error.

In the training process, verification models in the verification database are first initialized. A known hypothesis string is selected. The verification processor generates a first string-based confidence measure signal based on the current verification model for the known hypothesis string.

One or more competitor string models, which are confusably similar to the current verification model for the known hypothesis string, are generated. The one or more competitor string models are presented to the verification processor, which generates one or more string-based confidence measure signals based on the known hypothesis string and the one or more competitor string models.

A misverification signal is generated by the verification processor based on the first string-based confidence measure signal for the known hypothesis string and the string-based confidence measure signals based on the one or more competitor string models. A loss function signal based on the misverification signal, provides a gradient which relates verification of the known hypothesis string based on the current verification model for that known hypothesis string to verification of the known hypothesis string with the one or more other competitor verification models. The gradient determination is accomplished utilizing a derivative of the loss function signal.

The verification models are updated to minimize the likelihood of misverifying an unknown hypothesis string. The updating process estimates an expected loss function signal, and iteratively adjusts the verification models responsive to the estimated loss function signal to minimize the likelihood of verification error.

The speech recognition system of the present invention can be operated to generate an optimum verification threshold signal value for verifying confidence measure signals generated by the verification processor. The verification threshold signal value provides the basis for a decision to reject a recognized hypothesis string and is selected to maintain a verification error rate.

A known hypothesis string is input to the verification processor, which is coupled to access the verification models stored in the verification database. One or more competitor string models are generated based on the known hypothesis string. The one or more competitor string models are provided to the verification processor.

The verification processor is operated for a preselected number of rounds to generate a first string-based confidence measure signal based on a current verification model for the known hypothesis string, and to generate a string-based confidence measure signal for each of the one or more competitor string models based on the known hypothesis string. A first distribution of string-based confidence measure signal values based on a current verification model for a known hypothesis string is recorded. A second distribution of string-based confidence measure signal values for the known hypothesis string and a competitor model is recorded. Respective means for the first distribution and for the second distribution are calculated. The verification threshold signal value is selected and adjusted based on the first mean and the second mean.

The techniques taught herein are directly related to minimizing the string verification error rate.

Other objects, advantages and salient features of the invention will become apparent from the following detailed description, which taken in conjunction with the annexed drawings, discloses preferred embodiments of the invention.

DETAILED DESCRIPTION

For clarity of explanation, the illustrative embodiments of the present invention are presented as comprising individual functional blocks (including functional blocks labeled as "processors"). The functions these blocks represent may be provided through the use of either shared or dedicated hardware, including, but not limited to, hardware capable of executing software. For example, the functions of processors presented in FIGS. 1-4 may be provided by a single shared processor. (Use of the term "processor" should not be construed to refer exclusively to hardware capable of executing software.)

Illustrative embodiments may comprise digital signal processor (DSP) hardware, such as the AT&T DSP16 or DSP32C, read-only memory (ROM) for storing software performing the operations discussed below, and random access memory (RAM) for storing DSP results. Very large scale integration (VLSI) hardware embodiments, as well as custom VLSI circuitry in combination with a general purpose DSP circuit, may also be provided.

Figure 1:
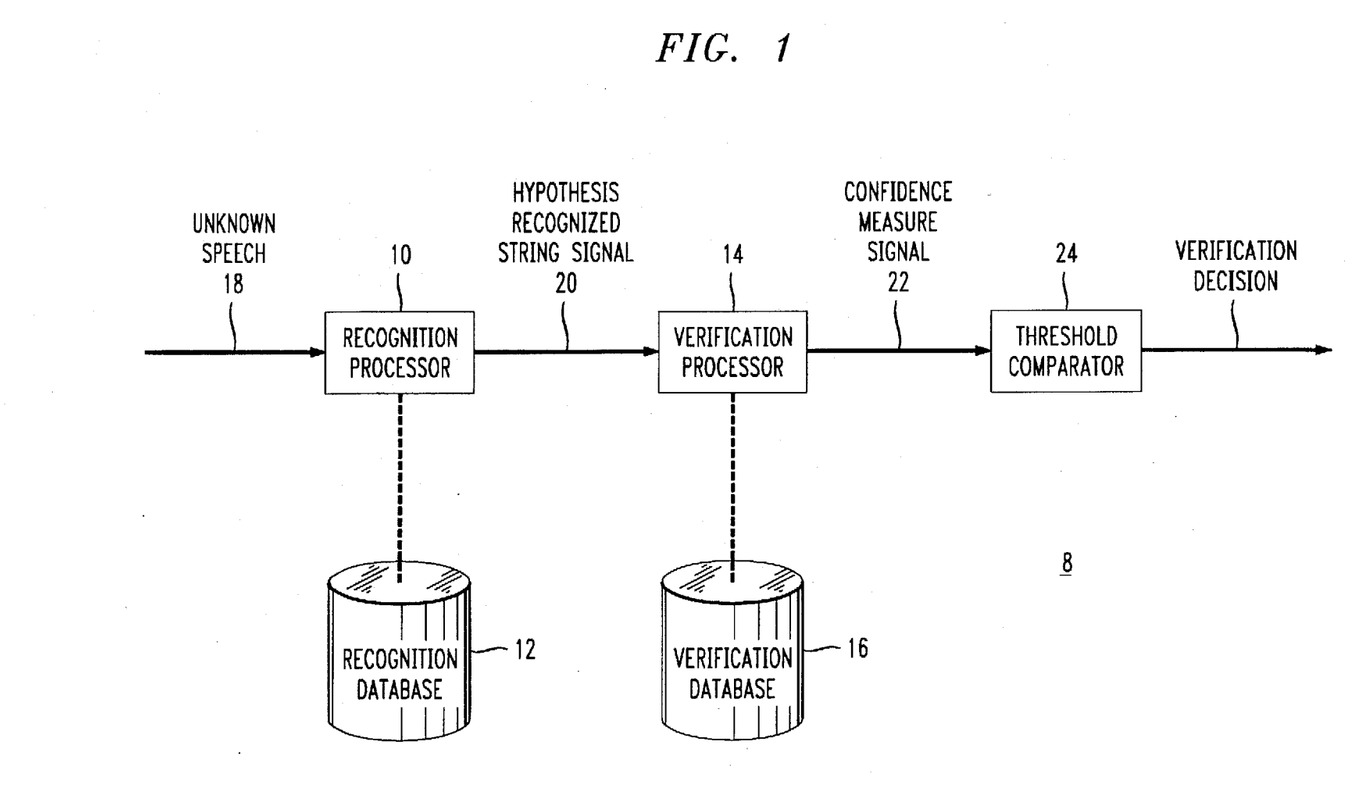
FIG. 1 presents an illustrative HMM-based speech recognition system according to the present invention.

FIG. 1 presents an illustrative embodiment of the present invention for purposes of general description in the context of an HMM-based speech recognition system. The speech recognition system 8 comprises a recognition processor 10, a recognition database 12 including a set of separate hidden Markov model ("HMM") recognition models, a verification processor 14, and a verification database 16 including a set of separate HMM verification models.

The recognition processor receives as input an unknown speech string 18 (an utterance) of words. The recognition processor 10 accesses the recognition database 12 in response to the unknown speech string 18 input and scores the unknown speech string of words against the recognition models in the recognition database 12 to classify the unknown string of words and to generate a hypothesis recognized string signal. The verification processor receives the hypothesis string signal 20 as input to be verified. The verification processor 14 accesses the verification database 16 to test the hypothesis string signal against verification models stored in the verification database. Based on the verification test, the verification processor 14 generates a confidence measure signal 22. The confidence measure signal is passed to a threshold comparator 24 to be compared against a verification threshold signal value to determine the accuracy of the classification decision made by the recognition processor 10.

Figure 2:
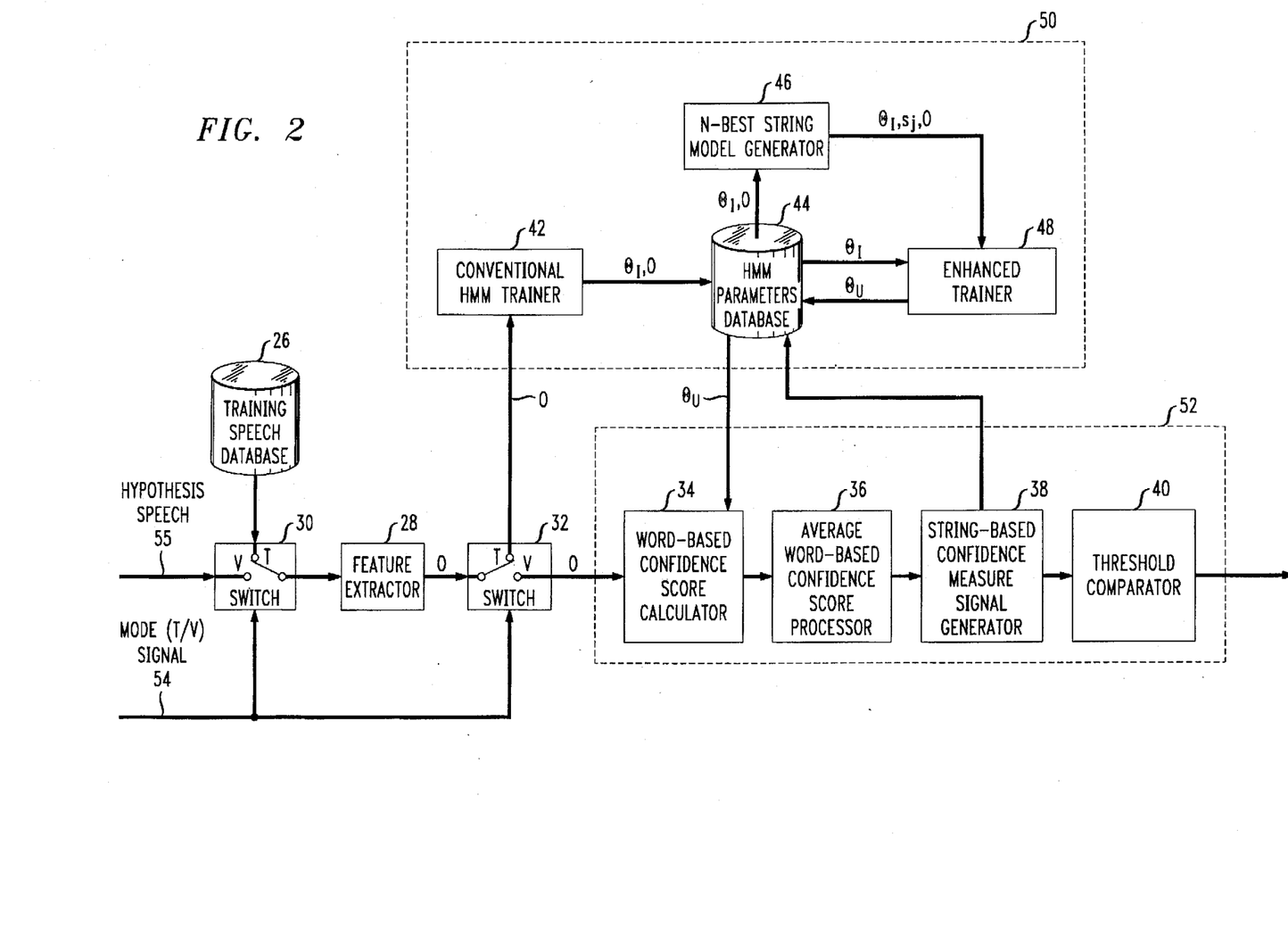
FIG. 2 presents a detailed schematic view of a verification section of the illustrative HMM-based speech recognition system of FIG. 1.

FIG. 2 presents a more detailed view for describing verification training and testing processes in the speech recognition system 8. Referring to FIG. 2, the speech recognition system comprises a training speech database 26, a feature extractor 28, a first mode switch 30, a second mode switch 32, a word-based confidence score calculator 34, an average word-based confidence score processor 36, a string-based confidence measure signal generator 38, a threshold comparator 40, a conventional HMM trainer 42, an HMM parameter verification database 44, an N-best string model generator 46, and an enhanced trainer 48.

The training speech database 26 comprises samples of known speech signals in digital form. Each speech signal corresponds to a string of one or more spoken words. These samples are used for the purposes of the conventional 42 and enhanced 48 trainers, respectively. Samples of known speech strings from the training speech database 26 are provided to other components of the system via the first mode switch 30.

The first mode 30 switch reflects two operational modes of the system: a training (T) mode, and a verification (V) mode for testing. When the first mode switch 30 is in the T position (as shown), training string signals from the training database 26 may be provided to the balance of the system such that training may be performed by a training section 50 of the system. When the first mode switch is in the V position, hypothetical recognized speech string signals in digital form are provided to the balance of the system for verification by the verification section 52 of the system.

The feature extractor 28 of the system is coupled to the first mode switch 30. Depending on the state of the first mode switch, the feature extractor 28 will receive either training string signals or hypothesis speech string signals. Based on these received string signals, the feature extractor produces one or more feature vectors, O, characterizing the string signals for verification or training purposes.

Feature vectors output from the feature extractor are provided to the second mode switch 32. The second mode switch operates in tandem with the first mode switch. That is, both switches are set to the same state (T or V) at the same time based upon a mode signal 54 provided to both switches. The second mode switch 32 directs the output of the feature extractor 28 to either the verification section 52 or the training section 50 of the system.

The verification section 52 of the system can be selected to test the recognition decisions made by the recognition processor 10 (FIG. 1). The verification section 52 shown in FIG. 2 comprises the word-based confidence score calculator 34, the average word-based confidence score processor 36, and the string-based confidence measure signal generator 38.

The feature extractor 28 outputs a series of frames of feature vectors. Word signals based on the frames of feature vectors are presented to the word-based confidence score calculator 34. The word-based confidence score calculator performs calculations on the discrete word signals. The word-based confidence score calculator 34 matches a string of one or more verification models (in this case, hidden Markov models "HMMs") to each word signal of the hypothetical recognized speech string signal. The confidence score calculator 34 generates a word-based confidence score for each word signal of the hypo-thesis string signal. The word-based confidence score calculated for each word segment of the string indicates a level of confidence that each particular word of the hypothesis string was correctly recognized and accurately corresponds to a word of the input utterance presented to the speech recognition system.

The average word-based confidence score processor 36 provides a means for performing a mathematical averaging operation on the set of word-based confidence scores generated for each word segment signal of the hypothesis string signal to generate an average word-based confidence score signal. The average confidence score signal is passed to the string-based confidence measure signal generator 38.

The string-based confidence measure signal generator 38 is coupled for receiving the average confidence score signal and is responsive to generate a string-based confidence measure signal. The string-based confidence measure signal embodies the verification test results and provides a measure of the confidence that the hypothesis string signal presented to the verification processor accurately represents the actual spoken string of words.

To verify that the hypothetical recognized speech string signal presented to the verification processor is the unknown speech string of words originally input to the speech recognition system, the confidence measure signal is compared to a verification threshold signal value 40. If the confidence measure signal is below the threshold signal value, then the hypothesis string signal is rejected as incorrectly representing the actual spoken input utterance; that is, the hypothesis string signal presented to the verification processor could not be verified.

The training section 50 of the system comprises the conventional HMM trainer 42, the HMM parameter database 44, the N-best string model generator 46, and the enhanced trainer 48. The conventional HMM trainer 42 is such as that described by U.S. Pat. No. 4,783,804 and provides conventional training of HMMs. The output of the conventional trainer comprises a set of one or more conventionally trained HMMs, as well as the feature vectors O of training speech strings on which the set of HMMs are based. The output of the conventional trainer 42 is recorded in the HMM parameter database 44 for use by the N-best string generator 46 and the enhanced trainer 48 as initialization parameters.

The enhanced trainer 48 receives initial parameters $\Theta_I$ and returns to the HMM parameter database a set of enhanced or updated HMMs, $\Theta_U$. Ultimately, enhanced models, $\Theta_U$, are provided to the word-based confidence score calculator 34 during verification mode processing. The word-based confidence score calculator's use of enhanced HMMs, $\Theta_U$, rather than conventionally trained HMMs, $\Theta_I$, provides for achieving a reduced string verification error rate.

The N-best string model generator 46 is coupled to receive hidden Markov model (HMM) parameters $\Theta_I$ and training speech strings O from the HMM parameter database 44. The N-best string model generator 46 is operative to generate a set of string models which are highly competitive with the current verification model for the hypothetical recognized string signal. These competitive string models provide a basis for discriminative training of the enhanced trainer 48; that is, for training the verification models so that a correct hypothesis string signal input to the verification processor will cause the verification processor to generate an extremely high confidence measure signal, and an incorrect hypothesis string input will cause the verification processor to generate a low confidence measure signal.

The N-best string generator 46 generates the "N" best (or most competitive) string models by determining the "N" best (competitive) word strings and, for each such word string, the best sequence of HMM verification models. Determination of the N-best word strings is made through use of DSP implementation of a modified Viterbi decoder.

The modified Viterbi decoder prepares a partial path map, i.e. a list of all scores (or metrics) of all partial paths leading to any grammar node (i.e. word juncture) at every time instant. Then, at the end of the modified Viterbi forward search, the decoder employs an A* traceback tree-search well known in the art. The generator performs the tree-search by growing the top (best) partial path which is at the top of a "stack" (a rank ordered datalist). The rank ordering of all partial paths on the stack is determined by the best possible score that a partial path can achieve when completed. The partial path map prepared in the forward Viterbi search provides a score for any incomplete partial path in the backward tree search. Due to the "best first" nature of the A* procedure, the top N strings are generated sequentially.

The admissibility of the A* algorithm, or sure findings of the optimal path(s), is guaranteed when an upper bound of the incomplete portion of a partial path is used as the stack decoder, given the stack depth is deep enough to avoid any search errors. In the tree trellis procedure, the tightest upper bound or the actual score of the path is obtained if the same HMMs are used in the searches along both directions. As a result, the search efficiency of the algorithm is maximized and a stack of N entries is needed.

The generator generates N-best string models based on the N-best word strings by a Viterbi alignment of the input speech string, O, against the model sets for each given word string in the N-best string list. This step is performed by the generator because there may be many string models corresponding to the same word string; but the string model that best matches the input utterance for a given model set is unique.

It should be noted that the generator provides a capability for modeling unseen competitive strings. This is due to the fact that competing word string models generated through N-best decoding are not limited by the training material. The N-best string list is dynamic and reflects the string level acoustic resolution based on the given speech verification model set.

Accordingly, the basic verification models in the HMM parameter database 44 are trained by string models generated by the N-best string model generator (a type of speech recognizer). The generated string models can be based on word strings not present in the original training material, but which the recognizer finds confusing with the known hypothesis string signal. These unseen competitor word strings which the recognizer finds confusing with the hypothesis string signal known are modeled discriminatively to improve verification modeling coverage for such unseen, confusably similar strings. Modeling which prepares the verification models to provide a basis for discriminating unseen strings (which are likely to be confused with a correct string) from the correct hypothesis string is useful because such modeling reduces difficulties encountered in continuous speech recognition and verification due to poor string coverage of the training material.

The operation of the N-best string model generator is described in detail in copending U.S. application Ser. No. 08/030,895 entitled RECOGNITION UNIT MODEL TRAINING BASED ON COMPETING WORD AND WORD STRING MODELS, filed Mar. 15, 1993, now U.S. Pat. No. 5,579,436 issued Nov. 26, 1996 to Chou et al., which is assigned to the owner of the present application and incorporated by reference as if fully set forth herein.

In minimum string verification error rate training, the N-best string level models are incorporated into a set of discriminant functions specially designed for representing and reducing string errors. This is done by operation of the enhanced trainer 48, as described below.

The utterance verification processor 14 (FIG. 1) operates to formulate and apply a statistical hypothesis test to verify a proposed hypothesis recognized utterance in the form of a hypothesis string signal. The verification process task is to test the null hypothesis, that a hypothesis keyword or a hypo-thesis set of keywords exist in an unknown utterance, against the alternative hypothesis, that such hypothesis keyword or keyword set does not exist within the unknown utterance (i.e., that the proposed recognized hypothesis utterance 20 is incorrect).

The verification process is designed using a likelihood ratio distance calculation to verify the accuracy of a proposed hypothesis utterance. In accordance with the present invention, utterance verification models are created (trained) on the string level and verification testing is conducted on the string level. Utterance verification, as taught herein, uses a form of geometric averaging that combines the contributions of word-based confidence scores of the word signal segments to generate the string-based confidence measure signal for a hypothesis string signal. The string-based confidence measure signal is verified against a threshold signal value 40 (FIG. 2) to accept or reject all or part of the hypothesis string signal.

Referring to FIG. 2, in verification testing mode a hypothesized string of words 55 is passed through the first mode switch 30 to the feature extractor 28 for presentation to the verification section 52. The hypothesized string (signal 55) of words i is segmented as a result of the recognition process into N number of words, $\{O_q\}$.

The verification section 52 utilizes a given set of models, $\Theta_U$, for verification. The verification section 52 generates a confidence measure signal based on the hypothesized string of words based on the current set of models in HMM parameter database 44. The hypothesized string of words is rejected if the generated confidence measure signal $$s_i(O;\Theta) = \log\left[(1/N)\Sigma^N_{q=1}\exp\{\kappa \cdot L(O_q;\Theta,l)\}\right]^{1/\kappa} \quad (1)$$

lies below a predefined verification threshold signal value $\tau$. Here, $\kappa$ is a negative constant and $L(O_q;\Theta,l)$ denotes the confidence score of the speech segment q that is recognized as the digit (frame) 1. Accordingly, the confidence measure signal is mathematically related to the average of the confidence scores of each speech segment q (word frame) of the string signal.

HMM-based verification models are stored in the verification database 44 for being accessed and utilized by the verification section 52. The verification models $\Theta$, within the verification database 44 consist of three different sets: keywords $\{\theta_i^{(k)}\}$, anti-keywords $\{\theta_i^{(a)}\}$ which handle confusibility among keywords, and a general acoustic filler model $\theta^{(f)}$ to identify non-keywords (invalid input).

The word-based confidence score 34 of the speech segment q, $L(O_q;\Theta,l)$, can be constructed using a log likelihood ratio between a keyword hypothesis and its competing alternative hypothesis, e.g., $$L(O_q;\Theta,l) = g_i(O_q) - G_i(O_q), \quad (2)$$

where $g_i(O_q) = \log p(O_q|\theta_i^{(k)})$, and $$G_i(O_q) = \log\left[\tfrac{1}{2}p(O_q|\theta_i^{(a)}) + \tfrac{1}{2}p(O_q|\theta^{(f)})\right]. \quad (3)$$

Thus, confidence score computation for a speech segment q relates a comparison between a word model score and scores computed with the anti-word model and using the filler model.

One method of maximizing the confidence measure signal $s_i(O;\Theta)$ in Eqn. (1) is to apply a maximum likelihood procedure to train the parameters of $\Theta$ to be stored in database 44. However, based on speech recognition experimentation, it can be shown that this type of training does not give the best performance in terms of minimizing the verification or recognition error rate.

For this reason, a minimum string classification error (MSCE) training process has been developed to create the recognition models in the recognition database 12 (FIG. 1). Such speech recognition training method is used to provide a speech recognition database based on one or more known speech signals and a set of current recognition models. In the MSCE training process, a first recognizer scoring signal is generated based on the known speech signal and a current recognition model for that signal. A set of confusable hypotheses are generated and applied to the recognizer to generate one or more other recognizer scoring signals each based on the known speech signal and another current recognition model.

A recognition processor generates a misclassification (misrecognition) signal based on the first recognizer scoring signal and the other competing recognizer scoring signals. Recognition model parameters are modified based on the misrecognition signal to decrease the likelihood of misrecognizing the known speech signal in training or an unknown speech signal in testing operations. A thorough description of the embodiment and procedures is presented in the aforementioned copending U.S. application Ser. No. 08/030,895, entitled RECOGNITION UNIT MODEL TRAINING BASED ON COMPETING WORD AND WORD STRING MODELS, filed Mar. 15, 1993, now U.S. Pat. No. 5,579,436 issued Nov. 26, 1996 to Chou et al. assigned to the owner of the present application.

The goal in string-based minimum string classification error (MSCE) training is to minimize an expected string classification error rate. In contrast, the goal in minimum string verification error (MSVE) training is to minimize an expected string verification error rate. Therefore, the specific objective function employed and mathematical strategy used in the MSCE approach is not consistent with optimum utterance verification performance.

The present invention utilizes a minimum string verification error (MSVE) training process in the same spirit as MSCE training but designed for the verification models in the HMM parameter database 44. A misverification measure is calculated and used to minimize the expected string verification error rate.

MSVE training is applied at the string level and is consistent with the objective function used in Eqn. (1). MSVE training is implemented so as to minimize the expected function:

$$E[S\{-s_i(O;\Theta)+S_i(O;\Theta)\}], \tag{4}$$

where S() is a smooth 0–1 sigmoid non-linear function.

Figure 3:
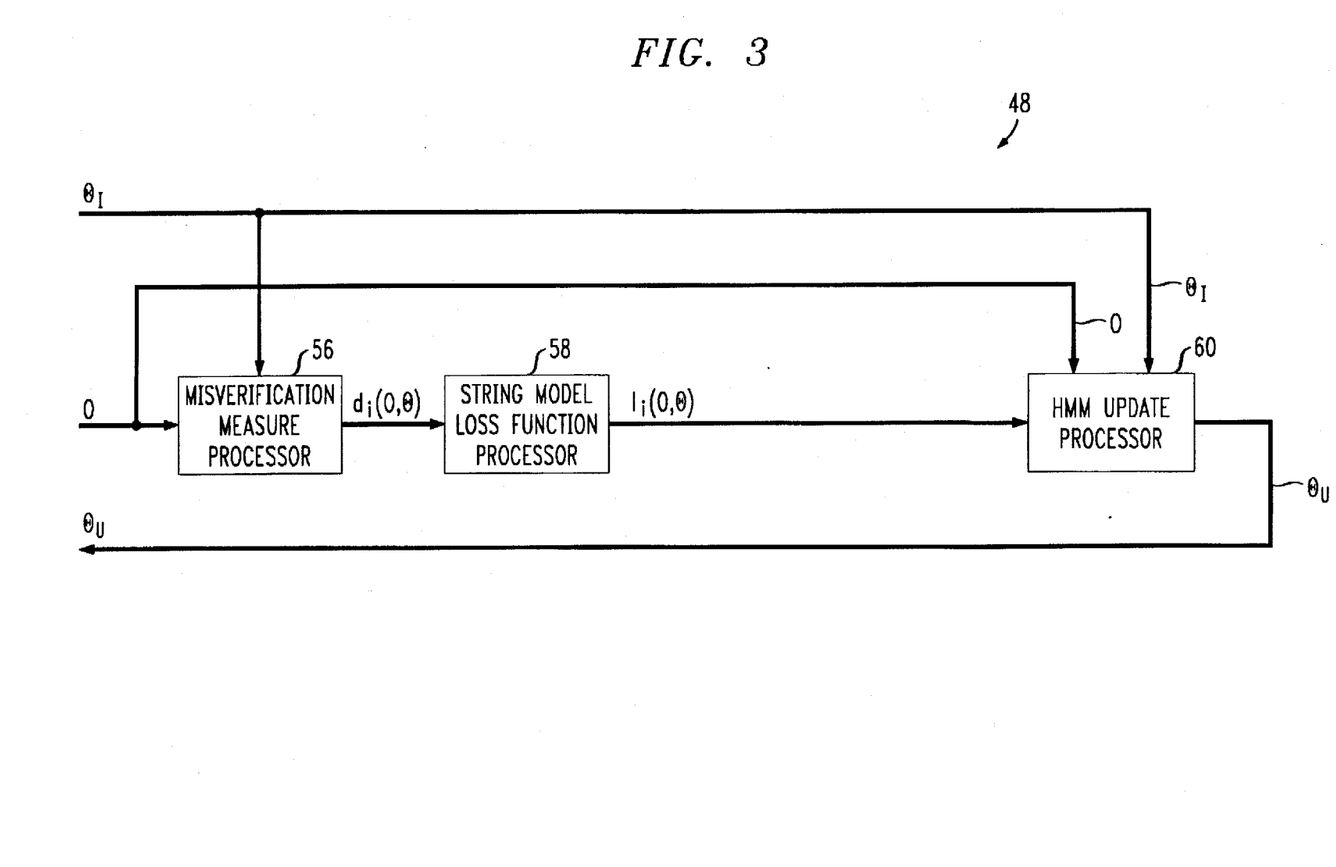
FIG. 3 presents an illustrative enhanced trainer of FIG. 2.

Referring to FIG. 3, the enhanced trainer 48 comprises a string misverification measure processor 56, a string model loss function processor 58, and an HMM update processor 60. The enhanced training process has as an objective to minimize the expected loss function described with respect to Eqn. (4) so as to substantially eliminate string verification error. In a preferred embodiment, the enhanced training process is embodied as two process steps performed by the aforementioned processors in the speech recognition system.

A. String Misverification Measure Processor

The string misverification measure processor 56 receives HMM parameters, $\Theta_I$, N string models, $s_j$, and a training speech string sample, $O$, from the N-best string model generator 46. Based on string sample, O, models $s_j$, and $\Theta_I$, the misverification processor 56 determines as a first process step a string misverification measure for the $i^{th}$ hypothesized string, $d_i(O;\Theta)$:

$$d_i(O;\Theta)=-s_i(O;\Theta)+S_i(O;\Theta), \tag{5}$$

where $s_i(O;\Theta)$ is an utterance-based discriminant function as defined by Eqn. (1), and $S_i(O;\Theta)$ is an anti-discriminant function which is defined as $$S_i(O;\Theta)=\log\ [(1/N-1)\Sigma^N_{j\ne i}exp\ \{\eta\cdot s_j(O;\Theta)\}]^{1/\eta},\ \eta>0, \tag{6}$$

where N is the total number of competing string hypotheses and η is a positive number illustratively set to two.

The string misverification processor 56 determines the value of a scalar, d, for use by the subsequent processors shown in FIG. 3 and generates a misverification signal describing a difference between: (a) the confidence measure signal based on a known hypothesis string signal and a current verification model for the known hypothesis string signal and (b) an average of one or more other confidence measure signals based on the N-best competing verification models for that known hypothesis string signal.

B. String Model Loss Function Processor

A second process step approximates the verification error count. This is done using a sigmoid non-linear function. The string model loss function processor 58 evaluates a smooth string loss function, $l_i(O;\Theta)$, based on the scalar value $d_i(O;\Theta)$ received from the misverification measure processor 56. This loss function is defined as $$l_i(O;\Theta)=\frac{1}{1+\exp\{-\alpha d_i(O;\Theta)+\beta\}}, \tag{7}$$

where α and β are constants which control the slope and the shift of the sigmoid non-linear smoothing function, respectively.

The string model loss-function processor 58 provides scalar 1 as output to the HMM update processor 60 in the form of a loss function signal.

Parameters α and β, discussed above, help provide a smoothed approximation to the string loss function, $l_i(O;\Theta)$. The gradient of the string loss function is used by the HMM update processor 60 to update the current verification model HMM parameters, $\Theta_I$. The gradient relates confidence measuring of a known hypothesis string signal based on a current verification model for that hypothesis string signal to confidence measuring of the known hypothesis string signal based on one or more other current verification models. Therefore, minimization of the expected string loss of this loss function is directly linked to the minimization of the string verification error probability.

C. HMM Update Processor

Prior to presenting a discussion of verification model parameter updating, some background to the operation of the HMM update processor 60 will be presented. Minimum string verification error (MSVE) training is directed to finding a set of parameters Θ that minimizes the expected loss function of Eqn. (7), which can be denoted $E[l_i(O;\Theta)]$.

To find the minimizing set of parameters Θ, the parameter set Θ is updated at every iteration n according to $$\Theta_{n+1}=\Theta_n-\epsilon_n V_n \nabla E[l_i(O;\Theta)],\ \epsilon_n>0. \tag{8}$$

In Eqn. (8), $\Theta_n$ is the initial HMM parameter set estimate. $E[l_i(O;\Theta)]$ is the expected loss function. $\nabla$ represents a mathematical derivative operation. $\Theta_{n+1}$ is the best estimate for the HMM parameter set to minimize the expected loss function $E[l_i(O;\Theta)]$.

This equation accomplishes a gradient descent recursion for adjusting the verification model parameters to achieve the minimum of the expected loss function, where $\epsilon_n$ is a learning rate or sequence of step size parameters used in the iterations and $V_n$ is a positive definite learning matrix defined below.

The recursion represented by Eqn. (8) will converge to a stationary point of the expected loss, provided that $\Sigma^\infty_{n=1}\epsilon_n=\infty$ and $\Sigma^\infty_{n=1}\epsilon_n^2<\infty$.

In the illustrated embodiment of FIG. 3, the HMM parameters are adaptively adjusted according to (8) by the HMM update processor 60. Due to the structure of the HMMs, their parameters must satisfy certain constraints. The HMM update processor employs transformed HMM parameters as part of the parameter update process to satisfy all such constraints. The following transformations are used by the HMM update processor:

(1) Logarithm of the variance $$\tilde{\sigma}^2_{i,j,k,d} = \log \sigma^2_{i,j,k,d} \tag{9}$$

where $\sigma^2_{i,j,k,d}$ is the variance of the i-th verification model, j-th state, k-th mixture component and d-th dimension of a feature vector, where each verification model may reflect, for example, a word or subword.

(2) Transformed logarithm of the mixture weights The original mixture weights, $c_{i,j,k}$, are related to the transformed mixture weights $\tilde{c}_{i,j,k}$ as follows:

$$c_{i,j,k} = \left[ \frac{e^{\tilde{c}_{ij,k}}}{\sum_{t=1}^{L} e^{\tilde{c}_{ij,t}}} \right] \tag{10}$$

where L is the total number of the mixture weights in the j-th state in the i-th verification model.

(3) Transformed logarithm of the transition probability The original transition probabilities, $a_{ij}$, are related to the transformed transition probabilities as follows:

$$a_{ij} = \frac{e^{\tilde{a}_{ij}}}{\sum_{k=1}^{M} e^{\tilde{a}_{i,k}}} \tag{11}$$

where M is total number of states in the i-th verification model.

A significant aspect of the illustrative embodiment concerns the handling of small variance. In some corrective training algorithms proposed in the past, variance adjustment is avoided, because if handled incorrectly, it can have an adverse effect.

Variances in HMMs can differ by as much as $10^4$ to $10^6$ times. These variances occur in the exponent part of the observation probability density function $b^i_j(x)$ and have a dominant effect on the likelihood score of HMMs. In the illustrative embodiment, this leads to a different sensitivity to HMM parameter adjustments, especially to the adjustment of mean parameters in the observation probability density function of HMMs.

In order to compensate for this vast difference in sensitivity, the embodiment employs a positive definite matrix $V_n$. The positive definite matrix $V_n$ is a diagonal matrix:

$$\mathrm{diag}(\sigma_1^2(n), \ldots, \sigma_D^2(n)), \tag{12}$$

for each state, where $\sigma^2(n)$ is the variance of HMM $\Theta_I$ at time n.

Figure 4:
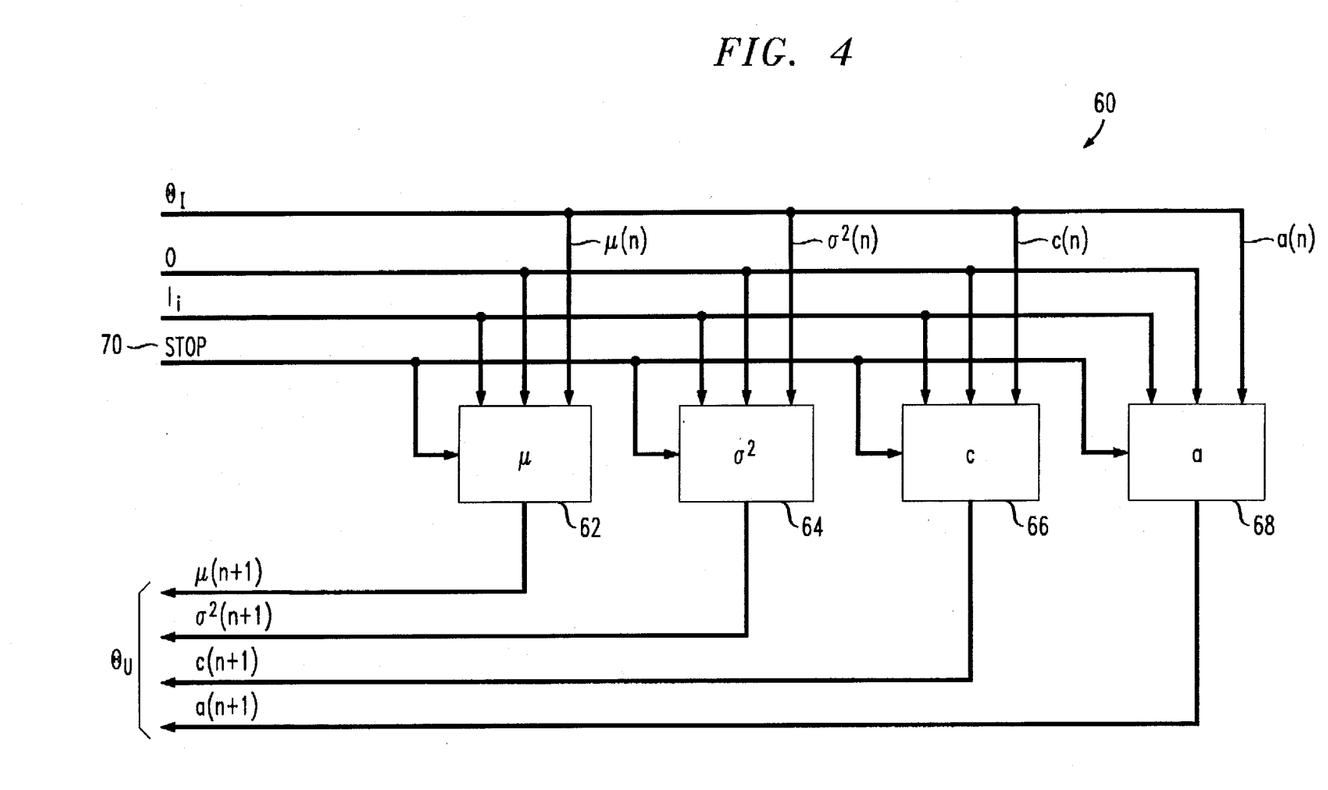
FIG. 4 presents an illustrative HMM update processor of the enhanced trainer of FIG. 3.

FIG. 4 presents an illustrative block diagram of the HMM update processor 60. As shown in the Figure, the HMM update processor 60 updates parameters $\mu$, $\sigma^2$, c, and a, based on $\Theta_I$, O and l, and returns an updated $\Theta_U$ to the HMM parameter database 44. Both $\Theta_I$ and $\Theta_U$ comprise parameters $\mu$, $\sigma^2$, c and a, with $\Theta_I$ and $\Theta_U$ representing unupdated and updated quantities respectively.

In minimum string verification error training, updating the model parameters as shown in Eqn. (8) involves finding the derivative of the loss function $\nabla l$. The term $\partial l/\partial \Theta$ is computed specifically for each model parameter and is different depending whether the underlying HMM is a keyword model, an anti-keyword model, or a filler model. This step is different from what is used in minimum string classification error training where the derivative $\partial l/\partial \Theta$ is common to all models.

In MSVE, $\partial l/\partial \Theta$ can be written as a chain rule, such that $\partial l/\partial \Theta = \partial l/\partial L \cdot \partial L/\partial \Theta$, where the term $\partial l/\partial L$ is common to all verification models. $\partial l/\partial L$ consists of the following partial derivatives:

$$\partial l/\partial d \cdot [\partial d/\partial s_i + \partial d/\partial S_j \cdot \partial S_j/\partial s_j] \cdot \partial S/\partial L.$$

$$\partial l/\partial d = \alpha l_i(1 - l_i);$$

$$\partial d/\partial s_i = -1;$$

$$\partial d/\partial S_j = 1;$$

$$\partial S_j/\partial s_j = \frac{\exp[\eta s_j(O;\Theta)]}{\sum_{j,j\neq i}^{N} \exp[\eta s_j(O;\Theta)]} ;$$

$$\partial S/\partial L = \frac{\exp[\kappa L(O_q;\Theta;1)]}{\sum_{q=1}^{N} \exp(\kappa L(O_q;\Theta;1)]} .$$

The derivative $\partial L/\partial \Theta$ differs depending on whether the updated model is a keyword $\Theta^{(k)}$, an anti-keyword $\Theta^{(a)}$ or a filler model $\Theta^{(f)}$.

For $\Theta^{(k)}$:

$$\partial L/\partial \Theta^{(k)} = \frac{1}{p(O_q|\Theta^{(k)})} \cdot \frac{\partial p(O_q|\Theta^{(k)})}{\partial \Theta^{(k)}}$$

For $\Theta^{(a)}$:

$$\partial L/\partial \Theta^{(a)} = \frac{-1}{p(O_q|\Theta^{(a)}) + p(O_q|\Theta^{(f)})} \cdot \frac{\partial p(O_q|\Theta^{(a)})}{\partial \Theta^{(a)}}$$

For $\Theta^{(f)}$:

$$\partial L/\partial \Theta^{(f)} = \frac{-1}{p(O_q|\Theta^{(a)}) + p(O_q|\Theta^{(f)})} \cdot \frac{\partial p(O_q|\Theta^{(f)})}{\partial \Theta^{(f)}}$$

The term $\partial p(\ )/\partial \Theta$ is common to all verification models and differs only by the specific parameters of the updated model. This probability $p(\ )$ is defined as:

$$p(O_q|\Theta) = \Sigma_{i_1 \ldots i_q} b_{i_1}(O_1) \cdot a_{i_1 i_2} \cdot b_{i_2}(O_2) \cdots b_{i_q}(O_q)$$

The parameter updates provided by the HMM update processor 60 are:

(1) Mean update $$\mu_{ij,k,d}(n+1) = \mu_{ij,k,d}(n) - \epsilon_n \Sigma_{nn=\omega_j}^{\omega_{j+1}-1}[(\partial l(O,\Theta)/\partial \log b_{ij}(o_{nn})]\gamma_{ij,k}(o_{n\cdot n})(o_{nn}(d) - \mu_{ij,k,d}(n)), \tag{13}$$

where $o_{nn}(d)$ is the d-th dimension component of the feature vector $o_{nn}$, $\omega_j$ corresponds to the time frame that the optimal path first enters the state j, $\omega_{j+1}$ corresponds to the time frame that the optimal path enters the state j+1, l(O,Θ) is the loss function constructed according to (7), $\epsilon_n$ is the step size and $$\gamma_{i,j,k}(o_{nn}) = (c_{i,j,k}(2\pi)^{-D/2}(\Pi^D_{d=1}\sigma_{i,j,k,d})^{-1}\Pi^D_{d=1}e^{-(o_{nn}(d)-\mu_{i,j,k,d})^2/2\sigma^2_{i,j,k,d}}/b_{i,j}(o_{nn}),$$ (14)

where D is the dimension of the feature vector. The mean update is provided by block 62 of FIG. 4.

(2) Variance update

Updating of $\bar{\sigma}^2 = \log \sigma^2$ is performed according to the following formula:

$$\bar{\sigma}^2_{i,j,k,d}(n+1) = $$ (15)

$$\bar{\sigma}^2_{i,j,k,d}(n) - \epsilon_n \sum_{nn=wj}^{wj+l-1} (\partial l(O,\Theta)/\partial \log b_{i,j}(o_{nn}))\gamma_{i,j,k}(o_{nn}) \cdot$$

$$((o_{nn}(d) - \mu_{i,j,k,d})^2/2\sigma^2_{i,j,k,d}(n) - 0.5),$$

where $\gamma_{i,j,k}(O_{nn})$ is defined as in (14). Therefore, the variance at time n+1 is given by $$\sigma^2_{i,j,k,d}(n+1) = e^{\bar{\sigma}^2_{i,j,k,d}(n+1)}$$ (16)

Variance is clipped below at $10^{-6}$ and it satisfies the constraint of $\sigma_{i,j,k,d}^2(n) > 10^{-6}$. The variance update is provided by block 64 of FIG. 4.

(3) Mixture weights update

The parameterized mixture weights are adjusted according to $$c_{i,j,k}(n+1) = \bar{c}_{i,j,k}(n) - \epsilon_n \sum^{wj+l-1}_{nn=wj}(\partial l(O,\Theta)/\partial \log b_{i,j}(o_{nn}))\cdot[c_{i,j,k}(n)/b_{i,j}(o_{nn})][N(o_{nn},\mu_{i,j,k,d},V_{i,j,k,d})-b_{i,j}(o_{nn})].$$ (17)

Therefore, the mixture weights at time n+1 is given by $$c_{i,j,k}(n+1) = \frac{e^{\bar{c}_{i,j,k}(n+1)}}{\sum_{l=1}^{L} e^{\bar{c}_{i,j,l}(n+1)}}.$$ (18)

Thus, the adjusted mixture weights meet the constraints of: $\Sigma_k c_{i,j,k}(n) = 1$ and $c_{i,j,k}(n) > 0$ during the training process of the present invention. The mixture weights update is provided by block 66 of FIG. 4.

(4) State transition probability update:

In a left-to-right HMM, the parameterized transition probability of the 1-th word model is adjusted by:

$$\begin{cases} \bar{a}^l_{i,i}(n+1) = \bar{a}^l_{i,i}(n) - \epsilon_n[\partial l(O,\Theta)/\partial g_l] \\ (N^l_{i,i} - (N^l_{i,i}+1)[(e^{\bar{a}^{-1}_{i,j}(n)})/(e^{\bar{a}^{-1}_{i,j}(n)} + e^{\bar{a}^{-2}_{i,j}(n)})]) \\ \bar{a}^l_{i,i+1}(n+1) = \bar{a}^l_{i,i+1}(n) - \epsilon_n[\partial l(O,\Theta)/\partial g_l] \\ (1 - (1+N^l_{i,i})[(e^{\bar{a}^{-1}_{i,i+1}(n)})/(e^{\bar{a}^{-1}_{i,i+1}(n)} + e^{\bar{a}^{-2}_{i,i+1}(n)})]) \end{cases}$$ (19)

where $g_l$ is the likelihood score of O in the l-th verification model, i is the end state and the total number of self-transition inside state i is denoted by $$N^l_{i,i} = \{\#\text{of}\}t(\omega_{t-1}, \omega_t) = (i,i) \text{ in l-th verification model } \lambda_l\} \quad (20)$$

Consequently, the transition probability at time (n+1) is given by $$\begin{cases} a^l_{i,i}(n+1) = [(e^{\bar{a}^{-1}_{i,j}(n+1)})/(e^{\bar{a}^{-1}_{i,j}(n+1)} + e^{\bar{a}^{-2}_{i,j+1}(n+1)})] \\ a^l_{i,i+1}(n+1) = [(e^{\bar{a}^{-1}_{i,j}(n+1)})/(e^{\bar{a}^{-1}_{i,i+1}(n+1)} + e^{\bar{a}^{-2}_{i,i+1}(n+1)})], \end{cases}$$ (21)

which also satisfies the constraints of $\Sigma_j a^l_{i,j}(n) = 1$, $a^l_{i,i} > 0$ and $a^l_{i,i+1} > 0$. The state transition probability update is provided by block 68 of FIG. 4.

Update expressions (15–18) computed by the update processor 60 relate to an updated observation probability density function of the i-th verification model, in the j-th state according to:

$$b_{i,j}(o) = \sum_{k=1}^{M} c_{i,j,k} N(O,\mu_{i,j,k},V_{i,j,k}) \quad (22)$$

were $c_{i,j,k}$ is the mixture weights and $N(O,\mu_{i,j,k}, V_{i,j,k})$ is a D-dimensional normal Gaussian distribution of the i-th recognition unit model, j-th state and k-th mixture with a diagonal covariance matrix $V_{i,j,k}$. Values for $\mu(n+1)$, $\sigma^2(n+1)$, and $c(n+1)$ output from blocks 62, 64, 66 are returned to the HMM parameter database 44, along with values for state transition probabilities a(n+1) provided by block 68. As shown in FIG. 4, $\Theta_U$ comprises updated values for $\mu$, $\sigma^2$, c and a.

Expressions for HMM parameter updating provided above concern the use of a single speech training string signal from the HMM parameter database 44 to enhance HMM parameters. The enhanced trainer 48 may iterate a plurality of times, however, to improve the HMM parameters. For example, the enhanced trainer 48 may operate on several passes or rounds through the complete HMM parameter database. The enhanced trainer may be made to stop processing samples in any of several ways. For example, the enhanced trainer 48 may stop when it has made a fixed number of rounds through the HMM parameter database 44 of samples. The enhanced trainer may also maintain a record of the incremental improvement in string verification error rate due to processing all speech training string signals of the current round. When incremental improvement drops below a threshold, processing may stop (see 70, FIG. 4, and STOP signal).

MSVE training can be implemented and applied to the preferred speech recognition system embodiment to design subword-specific keyword and anti-keyword model parameters. In each training round, the discriminant function $s_i(O;\Theta)$ defined by Eqn. (1) is set to the confidence measure signal value for the known hypothesis string signal based on the current verification model, and the anti-discriminant function $S_i(O;\Theta)$ defined by Eqn. (16) is approximated by the confidence measure signal values for the known hypothesis string signal based on one or more competing string models using an N-best string hypothesis. The misverification measure signal is determined as in Eqn. (5). A distribution of confidence measure signal values and misverification measures for a training round can be recorded in memory and utilized to determine a critical threshold value.

The performance of utterance verification systems can be enhanced by selection of an appropriate critical threshold. Thresholds can be set according to a predefined criterion, such as to obtain a minimum total error rate, or to achieve an equal error rate in which false rejection errors (Type I) equal false acceptance errors (Type II). The verification threshold may be set initially to obtain a desired trade-off between false rejection errors (Type I) and false acceptance errors (Type II). The respective error rates may be effected by environmental disparity between the training data and the testing data. Environmental disparity can include different speakers, with different accents, or different surrounding ambient noise.

An equal verification error rate for both Type I and Type II errors can be attained by the speech recognition system of the present invention, however, the equal error rate can vary for different selected threshold signal values. At different selected threshold values, the Type I error rate can be higher or lower than the Type II error rate. Therefore, an operating threshold signal value for performing verification of the hypothesis word string signal under specific environmental conditions may not be appropriate for different environmental conditions.

Different error rates for Type I and Type II errors might be advantageous in commercial applications, in which false rejection errors might be more harmful than false acceptance errors, or vice versa. The present invention provides a mechanism for adjusting the critical threshold value of the confidence measure signal generated by the verification processor in order to maintain a desirable trade-off between Type I and Type II errors.

Figure 5:
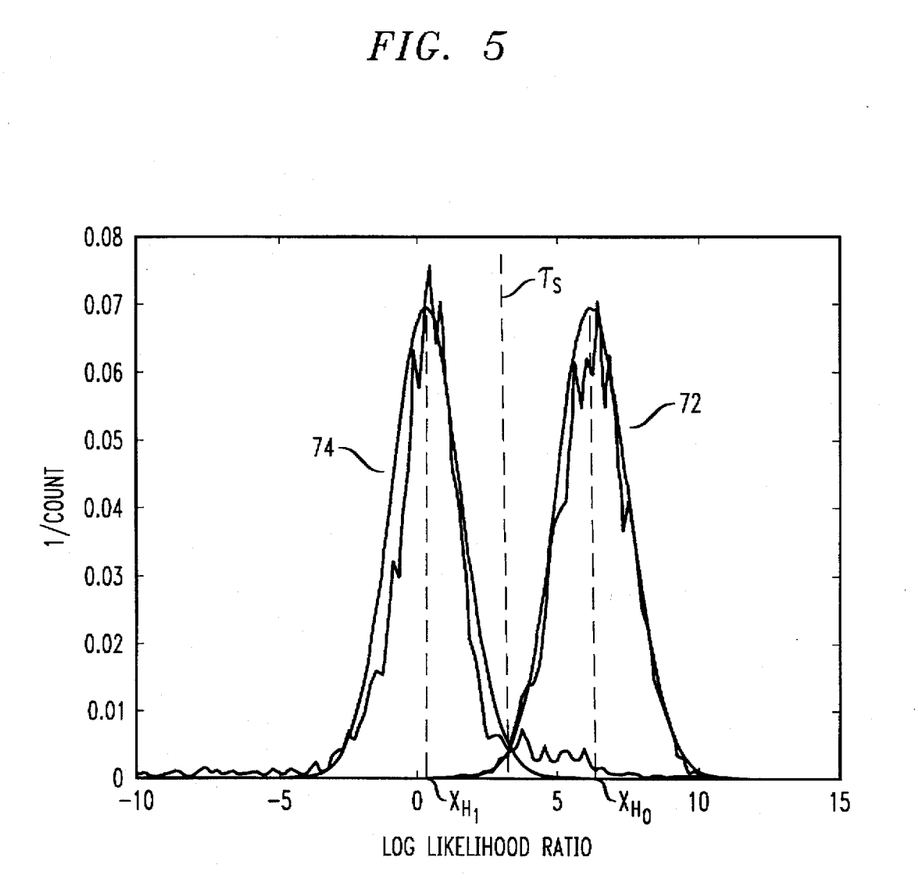
FIG. 5 presents confidence measure signal value distributions for describing verification threshold signal value determination.

A threshold adaptation technique according to the present invention utilizes the confidence measure signal value generated responsive to known hypothesis string signals to adapt the verification threshold signal value. The threshold operating point is adjusted as groups of hypothesis string signals become available. A distribution of confidence measure signal values (from Eqn. (1)) are recorded for a class of correct hypothesis string signals 72 and for a class of incorrect hypothesis string signals 74, as shown in FIG. 5. The right distribution 72 presents the confidence measure signals generated when a word string is both valid and classified (recognized) correctly. The distribution 74 on the left presents the confidence measure signals generated for invalid word strings and other strings that have been incorrectly recognized.

The two distributions 72, 74 have a similar shape, with the variances of the two distributions being almost equal. This feature is utilized, as taught herein, for performing threshold adaptation.

Let $\overline{X}_{HO}$ correspond to the average confidence measure signal value of $S(O;\Theta)$, such that $O \subset C$, and let $\overline{X}_{HI}$ correspond to the average confidence measure signal value $S(O;\Theta)$, such that $O \not\subset C$, where C is a correctly recognized hypothesis string signal. Assuming an equal variance for both distributions, in order to achieve an equal error rate or a minimum total error rate, the critical threshold, $\tau_8$, is positioned at $$\tau_8 = [\overline{X}_{HO} + \overline{X}_{HI}]/2 \tag{23}$$

Threshold adaptation can be conducted during operational verification testing so as to position $\tau_8$ midway between the two distributions and to adjust the value of $\tau_8$ when $\overline{X}_{HO} - \tau_8 \neq \tau_8 - \overline{X}_{HI}$. In practice, it is difficult to determine the actual instantaneous means of the two distributions while the system is running. As a result, verification processing commences with some initial estimates for $\overline{X}_{HO}$ and $\overline{X}_{HI}$. These values are adjusted every time a sufficient number of strings ("R") are received, so that $\tau_8$ can be adapted. This process is carried out as follows.

Using a number R of string confidence measure signal values, the values of $\overline{X}_{HO}$ and $\overline{X}_{HI}$ are estimated and used to compute an error measure:

$$E_1 = (\overline{X}_{HO} - \tau_8) - (\tau_8 - \overline{X}_{HI}). \tag{24}$$

In order to avoid biasing the averages due to the long tails of the distributions 72, 74 shown in FIG. 5, confidence measures exceeding predefined maximum and minimum thresholds are clipped. In addition, the error function is smoothed using a shifted sigmoid of the form $$\overline{E}_1 = \frac{1}{1 + \exp\{-\alpha_1 E_1\}} - 0.5, \tag{25}$$

where $\alpha_1$, which determines the degree of smoothing, was set to 0.1. The critical threshold $\tau_8(n)$ after processing n strings would then be updated as follows:

$$\Delta \tau_8(n) = B_1 \overline{E}_1, \tag{26}$$

where $B_1$ is the step size and $\Delta \tau_8(n) = \tau_8(n) - \tau_8(n-1)$. During adaptation, the value of $\tau_8$ was not allowed to exceed $\tau_8(0) \pm 2$.

During adaptation of the verification threshold value according to the present invention, strings are presented for recognition and verification in a random order to ensure equal and sufficient information for estimating the averages. The critical threshold is initially set at a minimum error rate point and is then adjusted for every 20 strings (i.e., R=20) to ensure the availability of a sufficient, but minimum, number of strings to compute the average of each distribution. This method of adjusting the verification threshold signal value provides for preselection and maintenance of both Type I and Type II error rates before and after adaptation.

A speaker-independent telephone-based connected digit database was used in experimental training and operational testing according to the present invention. Digit strings ranging from one to sixteen digits in length were extracted from different field-trial collections. The field trial collections represented varied environmental conditions and acoustic transducer equipment.

The training set consisted of 16089 digit strings. The testing set consisted of 27702 digit strings. Approximately 22% of the utterances included out-of-vocabulary words, false starts, and significant background noise. A separate database consisting of 3000 phonetically rich sentences was provided for training the filler models. Verification results exceeded 99% correct rejection.

From the foregoing, it will be appreciated that the present invention provides a string-based minimum verification error training process for utterance verification. The discriminative approach to training the verification processor models is consistent with the objective function used for utterance verification, and is directly related to minimizing the expected string verification error rate.

In light of the above, it will be apparent to one of ordinary skill in the art that the present invention is applicable to both speaker-dependent and speaker-independent speech recognition. It will be further apparent that although discussed in the context of speech recognition, the techniques used to train models are applicable to pattern recognition generally.

It is to be understood that the above-described embodiments are merely illustrative, and that many variations can be devised by those skilled in the art without departing from the scope of the invention as defined by the appended claims.

What is claimed is:

1. A speech signal processing method of making a speech recognizer verification model database based on one or more known hypothesis string signals representing known speech utterances and a set of current verification models, the method comprising the following steps:

(A) receiving a known hypothesis string signal representing a known speech utterance;

(B) generating a first string-based confidence measure signal based on the known hypothesis string signal representing a known speech utterance and a current verification model for that signal;

(C) generating one or more other string-based confidence measure signals, each such string-based confidence measure signal based on the known hypothesis string signal representing a known speech utterance and another current verification model;

(D) computing a misverification signal based on the first string-based confidence measure signal and the other string-based confidence measure signals;

(E) based on the misverification signal and the known hypothesis string signal representing a known speech utterance, modifying one or more of the current verification models to decrease the likelihood of misverifying an unknown hypothesis string signal representing an unknown speech utterance; and (F) storing one or more modified verification models in memory.

2. A method according to claim 1, further comprising the step:

initializing the verification models in the verification database.

3. A method according to claim 1, further comprising the steps:

computing a loss function signal based on the misverification signal; and determining a gradient of the loss function signal including calculating the derivative of the loss function signal.

4. A method according to claim 1, wherein step (B) comprises the steps:

segmenting the known hypothesis string signal into a series of word signals;

calculating a word-based confidence score for each word signal of the series; and averaging the word-based confidence scores calculated for each word signal.

5. A method according to claim 1, wherein step (C) comprises the steps:

generating a set of confusable string models based on the known hypothesis string signal, a confusable string model comprising one or more word models;

generating a string-based confidence measure signal for each of the set of confusable string models; and calculating an average of the string-based confidence measure signals for each of the set of confusable string models.

6. A method according to claim 5, wherein step (C) further comprises the steps:

determining a word-based confidence score for each word model of each of the set of confusable string models; and averaging the word-based confidence scores determined for each word model of each of the set of confusable string model to generate the string-based confidence measure signal for each of the set of confusable string models.

7. A method according to claim 1, wherein step (D) comprises the step:

determining a gradient of a function relating
(a) confidence measure signal generation for the known hypothesis string signal based on a current verification model for that hypothesis string signal to
(b) confidence measure signal generation for the known hypothesis string signal based on one or more other current verification models.

8. A method according to claim 7, wherein step (E) comprises the step:

adjusting one or more parameters of the current verification models based on the gradient.

9. A method according to claim 1, wherein step (D) comprises the step:

forming a difference between
(a) the first string-based confidence measure signal and
(b) an average of the one or more other confidence measure signals.

10. A method according to claim 3, further comprising the steps:

estimating an expected loss function signal; and iteratively adjusting the verification models responsive to the estimated loss function signal to minimize the likelihood of verification error.

11. A speech recognition system for recognizing a string of connected spoken words, comprising:

a recognition processor for generating a hypothesis string signal representing an unknown speech utterance responsive to an acoustic input string of connected spoken words;

a recognition database for storing recognition models;

a verification processor for generating a string-based confidence measure signal responsive to the hypothesis string signal representing an unknown speech utterance; and a verification database for storing verification models.

12. A speech recognition system according to claim 11, further comprising:

means, coupled to the verification processor, for calculating a verification threshold signal value of a string-based confidence measure signal;

means for measuring the string-based confidence measure signal to generate a measured signal value; and means for comparing the measured signal value to the threshold signal value.

13. A speech recognition system according to claim 11, wherein:

the verification models comprise a set of hidden Markov model parameters.

14. A speech recognition system according to claim 11, wherein:

the verification models are selected from the group consisting of keyword models, anti-keyword models, acoustic filler models, and combinations thereof.

15. A speech recognition system according to claim 11, wherein:

the verification models reflect discriminative training.

16. A speech recognition system according to claim 11, wherein:

the hypothesis string signal comprises a segmented series of word signals; and the verification processor comprises means for calculating a word-based confidence score for each word signal of the segmented series; and means for generating the string-based confidence measure signal responsive to an average of the word-based confidence scores for each word signal of the segmented series.

17. A speech signal processing method for generating a verification threshold signal sample of a confidence measure signal generated by a verification processor in a speech recognition system, comprising the following steps:

(A) performing a round of operating the verification processor to
  (i) generate a first string-based confidence measure signal based on a known hypothesis string signal representing a known speech utterance and a current verification model for the known hypothesis string signal representing a known speech utterance, and
  (ii) generate one or more other string-based confidence measure signals, each such string-based confidence measure signal based on the known hypothesis string signal representing a known speech utterance and another verification model;

(B) repeating step (A) for a preselected number of rounds;

(C) recording a first distribution of first string-based confidence measure signal values for the preselected number of rounds;

(D) recording a second distribution of the one or more other string-based confidence measure signal values for the preselected number of rounds;

(E) calculating a first mean for the first distribution;

(F) calculating a second mean for the second distribution; and (G) generating the verification threshold signal sample based on the first mean and the second mean.

18. A method according to claim 17, further comprising the steps:

selecting a false rejection verification error rate;

selecting a false acceptance verification error rate; and estimating an initial verification threshold signal value based on the selected false rejection verification error rate and the selected false acceptance verification error rate.

19. A method according to claim 18, further comprising the steps:

generating the verification threshold signal value while the speech recognition system is operating; and maintaining the false rejection verification error rate and the false acceptance verification error rate while the recognition system is operating.

\* \* \* \* \*